US008869129B2

(12) United States Patent
Oh et al.

(10) Patent No.: US 8,869,129 B2
(45) Date of Patent: Oct. 21, 2014

(54) APPARATUS AND METHOD FOR SCHEDULING INSTRUCTION

(75) Inventors: Tae-wook Oh, Seoul (KR); Won-sub Kim, Seoul (KR); Bernhard Egger, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 12/610,571

(22) Filed: Nov. 2, 2009

(65) Prior Publication Data

US 2010/0185839 A1 Jul. 22, 2010

(30) Foreign Application Priority Data

Jan. 19, 2009 (KR) ........................ 10-2009-0004281

(51) Int. Cl.
*G06F 9/45* (2006.01)
*G06F 7/00* (2006.01)

(52) U.S. Cl.
CPC ..................................... *G06F 8/451* (2013.01)
USPC ........... 717/161; 717/141; 717/156; 717/160; 707/713; 712/241

(58) Field of Classification Search
None
See application file for complete search history.

(56) References Cited

U.S. PATENT DOCUMENTS

| 5,491,823 | A * | 2/1996 | Ruttenberg ................... 717/161 |
| 5,835,776 | A * | 11/1998 | Tirumalai et al. ............. 717/161 |
| 8,281,297 | B2 * | 10/2012 | Dasu et al. ..................... 717/161 |
| 8,745,608 | B2 * | 6/2014 | Kim et al. ..................... 717/161 |
| 2002/0144092 | A1 * | 10/2002 | Topham et al. ............... 712/217 |
| 2003/0056091 | A1 | 3/2003 | Greenberg |
| 2003/0135724 | A1 * | 7/2003 | Krishnamurthy et al. .... 712/245 |
| 2004/0068711 | A1 * | 4/2004 | Gupta et al. ..................... 716/18 |
| 2004/0163053 | A1 * | 8/2004 | Snider ............................. 716/3 |
| 2007/0162729 | A1 | 7/2007 | Ryu et al. |
| 2008/0104601 | A1 * | 5/2008 | Kaneko et al. ................ 718/103 |
| 2009/0070552 | A1 * | 3/2009 | Kanstein et al. ................ 712/29 |
| 2010/0122105 | A1 * | 5/2010 | Arslan et al. .................. 713/500 |
| 2010/0325608 | A1 * | 12/2010 | Radigan ........................ 717/106 |

FOREIGN PATENT DOCUMENTS

KR 10-0681199 2/2007

OTHER PUBLICATIONS

Rauchwerger, et al. "Parallelizing While Loops for Multiprocessor Systems". Published in Parallel Processing Symposium, 1995, 9th International. pp. 347-356. Printed 1995. Available: http://ieeexplore.ieee.org/xpls/abs_all.jsp?arnumber=395955&tag=1.*
G. Dimitrouloakos, et al, "Resource Constrained Modulo Scheduling for Coarse-Grained Reconfigurable Arrays," Circuits and Systems, 2006, ISCAS 2006, Proceedings, 2006 IEEE International Symposium, May 2006, pp. 2902-2904.
Omitted for blind review, "Recurrence Cycle Aware Modulo Scheduling for Coarse-Grained Reconfigurable Architectures," ACM SIGPLAN Notices vol. 44, Issue 7, Jul. 2009, pp. 1-11.
Akira Hatanaka, et al., "A Modulo Scheduling Algorithm for a Coarse-Grain Reconfigurable Array Template," Parallel and Distributed Processing Symposium, IPDPS 2007.,IEEE International, Mar. 2007.

* cited by examiner

*Primary Examiner* — Michael Sun
(74) *Attorney, Agent, or Firm* — NSIP Law

(57) ABSTRACT

An apparatus and method for scheduling an instruction are provided. The apparatus includes an analyzer configured to analyze dependency of a plurality of recurrence loops and a scheduler configured to schedule the recurrence loops based the analyzed dependencies. When scheduling a plurality of recurrence loops, the apparatus first schedules a dominant loop whose loop head has no dependency on another loop among the recurrence loops.

15 Claims, 3 Drawing Sheets

APPARATUS AND METHOD FOR SCHEDULING INSTRUCTION

CROSS-REFERENCE TO RELATED APPLICATION

This application claims the benefit under 35 U.S.C. §119(a) of a Korean Patent Application No. 10-2009-4281, filed on Jan. 19, 2009, in the Korean Intellectual Property Office, the entire disclosure of which is incorporated herein by reference for all purposes.

BACKGROUND

1. Field

The following description relates to instruction scheduling, and more particularly, to an apparatus and method for scheduling an instruction for a reconfigurable processor.

2. Description of the Related Art

A coarse-grained reconfigurable array (CGRA) includes an accelerator used to improve is program execution speed, indicating a set of several functional units that can process various operations. A general platform using an application-specific integrated circuit (ASIC) may show faster execution speed than a general-purpose processor, but may not be able to process various applications. On the other hand, a platform using the CGRA may process many operations in parallel to improve its performance while remaining flexible. Thus, the platform using a CGRA may be an efficient platform for a next-generation digital signal processor (DSP).

A CGRA uses instruction-level parallelism (ILP) between operations of an application as much as possible. To be specific, operations that can be simultaneously processed are distributed to a plurality of functional units constituting a CGRA and processed simultaneously, thereby reducing the execution time of the application. To sufficiently use ILP of an application, a CGRA generally uses modulo scheduling. Modulo scheduling includes a scheduling algorithm using a software pipelining technique. Modulo scheduling may overlap successive iteration operations of a loop and increases ILP of instructions between iterations of different loops, thereby improving performance. As a result of modulo scheduling, iterations in a loop may be started at regular time intervals. Here, the time interval is referred to as an iteration interval (II), and consequently, is associated with a throughput of a pipeline. For this reason, the shorter the II, the better quality results from modulo scheduling.

However, a scheduler for a CGRA should perform scheduling in consideration of operand routing between operations, unlike a general modulo scheduler. This is because a CGRA has a characteristic in that a connection logic between functional units is very sparse to keep hardware complexity at a predetermined level or less.

SUMMARY

In one general aspect, there is provided an apparatus for scheduling an instruction, including an analyzer configured to analyze dependency of a plurality of recurrence loops, and a is scheduler configured to schedule the recurrence loops based on the analyzed dependencies. When scheduling the recurrence loops, the scheduler may schedule a dominant loop whose loop head has no dependency on another loop among the recurrence loops.

The analyzer may analyze the dependency by searching for loop heads to be scheduled in advance for respective loop heads of the recurrence loops using a data flow graph for the instruction.

When a sub-dominant loop becomes a successive dominant loop because dependency is removed by scheduling the dominant loop, the scheduler may schedule nodes on a path from the dominant loop to the sub-dominant loop in a data flow graph and schedule the sub-dominant loop.

The scheduler may schedule non-scheduled nodes from nodes in the data flow graph.

When a plurality of loop heads are dependent on each other, the scheduler may give priorities to the loop heads of loops in increasing order of a number of non-scheduled predecessors among the loop heads, and schedule the loops based on the given priorities.

When scheduling the loops based on the given priorities, the scheduler may schedule nodes on a path from a first loop head having a high priority to a second loop head having a next priority in the data flow graph.

When instruction scheduling fails, the scheduler may increase a current iteration interval and retry the instruction scheduling based on the increased iteration interval.

In another aspect, there is provided a method of scheduling an instruction, including analyzing dependency of a plurality of recurrence loops, and scheduling the recurrence loops based on the analyzed dependency. The scheduling of the recurrence loops may include first scheduling a dominant loop whose loop head has no dependency on another loop among the recurrence loops.

The analyzing of the dependency may include searching for loop heads to be scheduled is in advance for respective loop heads of the recurrence loops using a data flow graph for the instruction.

The scheduling of the recurrence loops may include, when a sub-dominant loop becomes a successive dominant loop because dependency is removed by scheduling the dominant loop, scheduling nodes on a path from the dominant loop to the sub-dominant loop in a data flow graph and scheduling the sub-dominant loop.

The scheduling of the recurrence loops may further include scheduling non-scheduled nodes among nodes in the data flow graph.

The scheduling of the recurrence loops may include, when two different loop heads are dependent on each other, giving priorities to the two loop heads in increasing order of a number of non-scheduled predecessors among the two loop heads, and scheduling loops based on the given priorities.

The scheduling of the loops based on the given priorities may include scheduling nodes on a path from a first loop head having a high priority to a second loop head having a next priority.

The scheduling of an instruction may also include, when instruction scheduling fails, increasing a current iteration interval and retrying the instruction scheduling based on the increased iteration interval.

Other features and aspects will be apparent from the following description, the drawings, and the claims.

DETAILED DESCRIPTION

Figure 1:
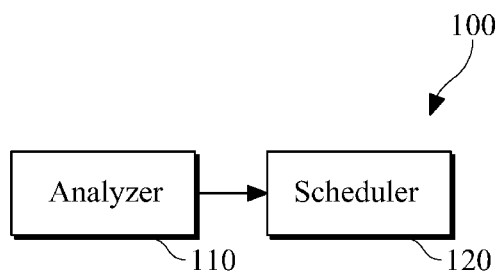
FIG. 1 is a block diagram illustrating an exemplary apparatus for scheduling an instruction.

Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses and/or systems described herein. Accordingly, various changes, modifications, and equivalents of the systems, apparatuses, and/or methods described herein will likely be suggested to those of ordinary skill in the art. Also, descriptions of well-known functions and constructions may be omitted for increased clarity and conciseness.

FIG. 1 illustrates an exemplary apparatus 100 for scheduling an instruction.

The apparatus 100 includes an analyzer 110 and a scheduler 120. Source applications may be compiled into intermediate codes in a preprocessing operation. The analyzer 110 may analyze the intermediate codes of the source applications and perform various methods of optimizing the intermediate codes. The scheduler 120 may schedule an instruction based on the result of the analysis operation.

Coarse-grained reconfigurable array (CGRA) scheduling may include two major tasks. One task may be placing or mapping operations of an application on functional units, and the other task may be routing data exchanged between the operations using communication resources of each architecture. For CGRA scheduling, the analyzer 110 may generate a data flow graph showing operations to be mapped onto a reconfigurable array and data dependency between the operations, and an architecture graph showing functional units in the CGRA and connectivity between the functional units.

In the data flow graph, the respective operations are represented by nodes, and dependencies between the operations using operands as media are represented by edges. Meanwhile, in the architecture graph, the respective functional units are represented by nodes, and wires between the functional units are represented by edges. When the two graphs are generated as described above, CGRA scheduling becomes a problem of mapping the data flow graph of the source application onto the architecture graph. The result of CGRA scheduling becomes configuration information of a CGRA configuration memory.

The apparatus 100 for scheduling an instruction is further described below centering on a scheduling operation for a task of placing operations of an application to functional units.

In general, a scheduler may first schedule a recurrence loop existing in a loop body. Unlike other nodes, a recurrence circuit should be scheduled in an iteration interval (II) cycle, and thus a scheduler first schedules a recurrence loop before other operations occupy resources. However, in this case, there is no reference to determine when each loop head of the recurrence loop will be scheduled. Thus, the scheduler may map the loop head at an arbitrary point in time, which may limit the degree of freedom in scheduling the other operations.

When there is a data flow edge from an operation outside of a recurrence loop to an operation in an already-scheduled recurrence loop (or when a data flow edge from a node not included in a recurrence loop to a node included in a recurrence loop exists in a data flow graph), the maximum schedule time of the operation outside of the recurrence loop may be bound by the is schedule time of the operation in the recurrence loop. This may place a restriction on scheduling. Also, when the schedule time of a target operation does not precede the schedule time of a source operation, the interval between the schedule times of the two operations may be too short to ensure a sufficient time margin for routing. In this case, routing failure may be declared.

In a CGRA, a connection between functional units may be sparse, and thus a scheduler should perform scheduling in consideration of operand routing between operations as well as placement of the operations. There are two limitations in operand routing. One is a resource limitation resulting from lack of routing resources, and the other is a time limitation caused by fixed schedule times of a producer operation and a consumer operation.

The scheduler 120 may schedule an instruction using edge-centric modulo scheduling (EMS). EMS is a fast and efficient scheduling technique. Instead of fixing a producer and a consumer in advance and then determining routing between the producer and the consumer, EMS may place the producer alone, search for an available routing path from the producer, and then map the consumer to a resource that can be routed. In other words, the EMS may remove the time limitation among the routing limitations.

However, operations constituting a recurrence loop in a data flow graph may have the time limitation, as mentioned above. Thus, in EMS, operations constituting a recurrence loop are first scheduled. However, a method of scheduling all loops in an arbitrary order without a reference for determining which loop will be scheduled first puts the time limitation on nodes not included in the loop, and thus scheduling is likely to fail.

According to an exemplary embodiment, the analyzer 110 may analyze dependency between loop heads, thereby analyzing dependency between a plurality of recurrence loops. The analyzer 110 may search for loop heads to be scheduled in advance for the respective loop is heads of the recurrence loops using a data flow graph for an instruction, thereby analyzing the dependency.

In other words, dependency analysis between loop heads may include a process of finding which loop heads are predecessors of loop heads in a data flow graph. When a loop head operation LH1 is scheduled before a loop head operation LH2 that is a predecessor of the loop head operation LH1, the time limitation may be put on all nodes existing on a path from the loop head operation LH2 to the loop head operation LH1 in the data flow graph. Thus, dependency analysis between loop heads becomes a reference to determine which loop head should be scheduled first among various loop heads in an application.

The scheduler 120 may schedule a plurality of recurrence loops based on the analyzed dependency. During the scheduling operation, the scheduler 120 may first schedule a dominant loop that has no dependency on another loop among the recurrence loops. In other words, a scheduling order of operations may be determined based on dependency between recurrence loops in a data flow graph such that the scheduling time margin of a node is less limited than the scheduling of operations as described above.

When a sub-dominant loop becomes a successive dominant loop because dependency is removed by scheduling the dominant loop, the scheduler 120 may schedule nodes on a path from the dominant loop to the sub-dominant loop in the data flow graph and then the sub-dominant loop. Subsequently, the scheduler 120 may finally schedule residual nodes that are not scheduled among nodes in the data flow graph.

Before scheduling a loop head, for example, loop head A, the scheduler 120 using dependency analysis may check whether all loop heads that are predecessors of loop head A are scheduled. The scheduler 120 may schedule paths from all the predecessor loop heads of loop head A to loop head A using a predetermined scheduling method, for example, EMS, thereby determining the schedule time of loop head A. Then, the scheduler 120 may schedule a is recurrence loop including loop head A.

Meanwhile, when a plurality of loop heads are dependent on each other, the scheduler 120 may give priorities to the loop heads of loops in increasing order of the number of non-scheduled predecessors among the loop heads, and schedule the loops based on the given priorities. When scheduling the loops based on the given priorities, the scheduler 120 may schedule nodes on a path from a first loop head having a high priority to a second loop head having the next priority as soon as possible.

Also, when instruction scheduling based on a predetermined II fails, the scheduler 120 may increase the II and retry instruction scheduling based on the increased II. When scheduling is performed in this way, the scheduling times of operations are less limited. The above process may be repeatedly performed on all loop heads.

As described above, instruction scheduling may be performed based on loop head dependency analysis such that a CGRA scheduling result can be rapidly and efficiently obtained using a short II.

Figure 2:
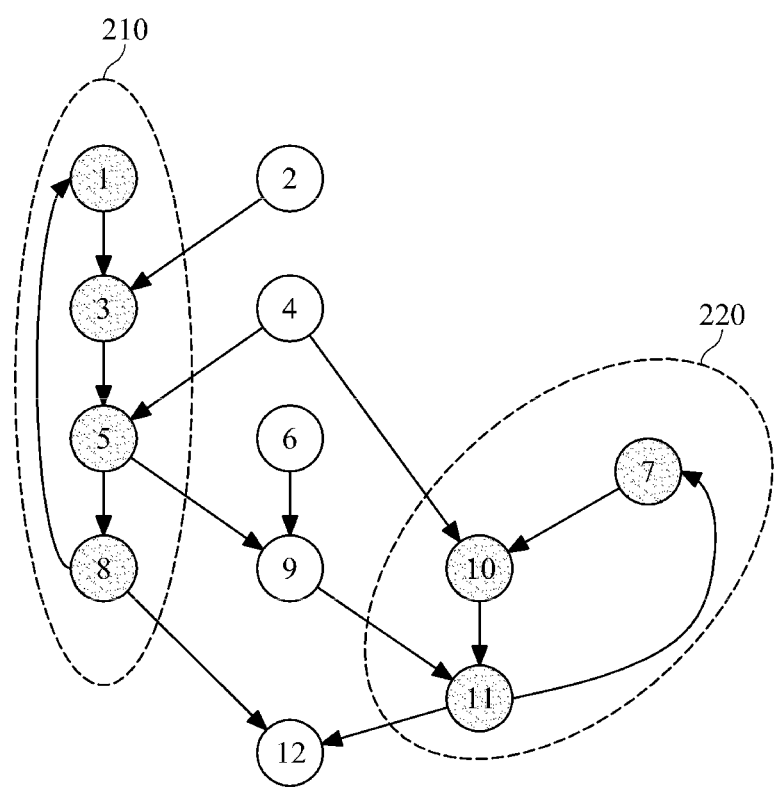
FIG. 2 shows a data flow graph illustrating an exemplary method of scheduling an instruction.

FIG. 2 shows a data flow graph illustrating an exemplary method of scheduling an instruction.

There are two loops 210 and 220 in the data flow graph shown in FIG. 2. First, dependency between loop heads is analyzed. It can be seen from a path flowing from node 1 to node 7 through node 3, node 5, node 9, and node 11 that the second loop 220 may be dependent on the first loop 210.

Since the first loop 210 may be a dominant loop that is not dependent on another loop, the first loop 210 is scheduled. In other words, node 1, node 3, node 5, and node 8 may be scheduled in sequence. When the first loop 210 is scheduled, the dependency of the second loop 220 may be removed.

Subsequently, it may be checked whether a path from the scheduled first loop 210 to the is second loop 220 can be scheduled. When the path can be scheduled, a path flowing from node 5 to node 11 through node 9 is scheduled, thereby checking whether a path from the first loop 210 to the second loop 220 can be scheduled. Although not shown in the data flow graph of FIG. 2, when a node is connected from a scheduled third loop to the second loop 220, scheduling may be performed in consideration of the scheduling time of the third loop. In this case, the path from the first loop 210 to the second loop 220 may not be scheduled, which may result in scheduling failure.

Subsequently, it may be checked whether the sub-dominant second loop 220 whose dependency has been removed by scheduling the first loop 210 can be scheduled. When the second loop 220 can be scheduled, the path flowing from node 5 to node 11 through node 9 may be scheduled, and a point in time when the second loop 220 should be scheduled can be thereby determined. With respect to the point in time, node 7, node 10 and node 11 included in the second loop 220 are scheduled. Since there is no loop to be scheduled, node 2, node 4, node 6 and node 12 that have not yet been scheduled may be scheduled.

Figure 3:
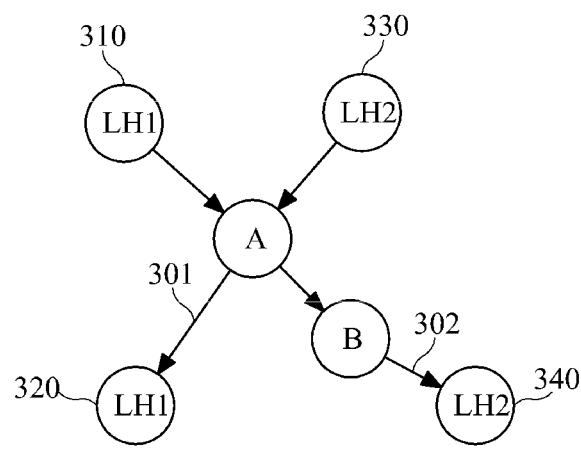
FIG. 3 shows a data flow graph illustrating another exemplary method of scheduling an instruction.

FIG. 3 shows a data flow graph illustrating another exemplary method of scheduling an instruction when a deadlock occurs between loops.

When dependencies of two or more loops are tangled with each other, the dependency limitation may not be removed. According to an exemplary embodiment, to minimize the number of nodes scheduled with the dependency limitation not removed, a loop head having the minimum number of predecessors may be searched for among loop heads that have not yet been scheduled, and a loop corresponding to the searched loop head may be first scheduled.

Here, for example, when a loop having a high priority is scheduled, a path in which a node of a loop having a lower priority is included as a predecessor of a node of the loop having a high priority may be ignored. The path in which a node of the loop having a lower priority is included as a predecessor may be scheduled later. When the loop having a lower priority is scheduled, resource allocation for scheduling nodes included in the loop can be performed in order to minimize a scheduling time for reading the loop head of the loop.

The data flow graph shown in FIG. 3 is described now. In FIG. 3, node LH1 310 and node LH2 330 are loop heads, and dotted lines 301 and 302 denote recurrence back-edges. In FIG. 3, node LH1 310 and node LH1 320 are the same node, and node LH2 330 and node LH2 340 are the same node. However, the nodes are separately shown to aid in understanding an exemplary embodiment. Node LH1 310 and node LH2 330 are reading data, and node LH1 320 and node LH2 340 are writing data in this exemplary embodiment.

As shown in FIG. 3, node LH1 310 and 320 and node LH2 330 and 340 may be dependent on each other, and thus one of the nodes should be selected and scheduled first. Here, for exemplary purposes, it is assumed that node LH1 310 is scheduled before node LH2 330 because the number of predecessors of node LH1 310 is smaller than that of node LH2 330.

When the schedule time of a loop including node LH1 310 is determined, a path flowing from node LH2 to node LH1 through node A may be ignored. When the reading operation corresponding to node LH1 310 is scheduled at a point in time t1, the writing operation corresponding to node LH1 320 may be performed at a point in time t1+II.

After this process, the dependencies of node LH1 310 and 320 having the minimum number of non-scheduled loop head predecessors among residual loop head nodes may be removed. Then, a path from node LH1 310 to loop head LH2 340 of another loop, that is, node LH1, node A, node B, and node LH2 may be scheduled in sequence.

When the dependencies of node LH2 330 and 340 are removed, node LH2 330 and 340 can be naturally scheduled during the process of scheduling a path flowing from node LH1 to node LH2 through node A and node B. When the writing operation corresponding to node LH2 340 is scheduled at a point in time t2, the reading operation corresponding to node LH2 330 may is be scheduled at a point in time t2−II.

After node LH2 330 and 340 is scheduled, the path flowing from node LH2 to node LH1 through node A that has been ignored should be scheduled. Here, the later the schedule time of node LH2 determined while the path flowing from node LH1 to node LH2 through node A and node B is scheduled, the more difficult routing an edge from node LH2 to node A may be. This is because a margin between the point in time t2−II of the reading operation corresponding to node LH2 330 and a schedule time t_A of node A may decrease as the point in time t2 becomes late.

Thus, as described above, when a node is a predecessor whose dependency is not completely removed, the schedule times of nodes on a path from a loop head having a high priority to a loop head having the next priority, that is, node LH1, node A, node B and node LH2 may be advanced as much as possible. Here, even if expensive resources are used to schedule nodes included in a loop having the next priority, the scheduler 120 may reduce as much scheduling time for reading the loop head having the next priority as possible. As described above, this is intended to minimize the time limitation put on a node (node A) between nodes (node LH1 and node LH2) scheduled with all dependencies not removed when the node (node A) is a predecessor whose dependency is not completely removed.

Figure 4:
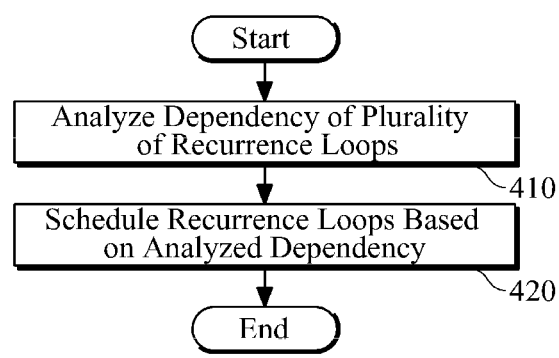
FIG. 4 is a flowchart illustrating an exemplary method of scheduling an instruction.

FIG. 4 is a flowchart illustrating an exemplary method of scheduling an instruction.

Dependencies of a plurality of recurrence loops are analyzed (operation 410). The recurrence loops are scheduled based on the analyzed dependencies (operation 420). When the recurrence loops are scheduled, a dominant loop whose loop head has no dependency on another loop may be first scheduled among the recurrence loops.

Figure 5:
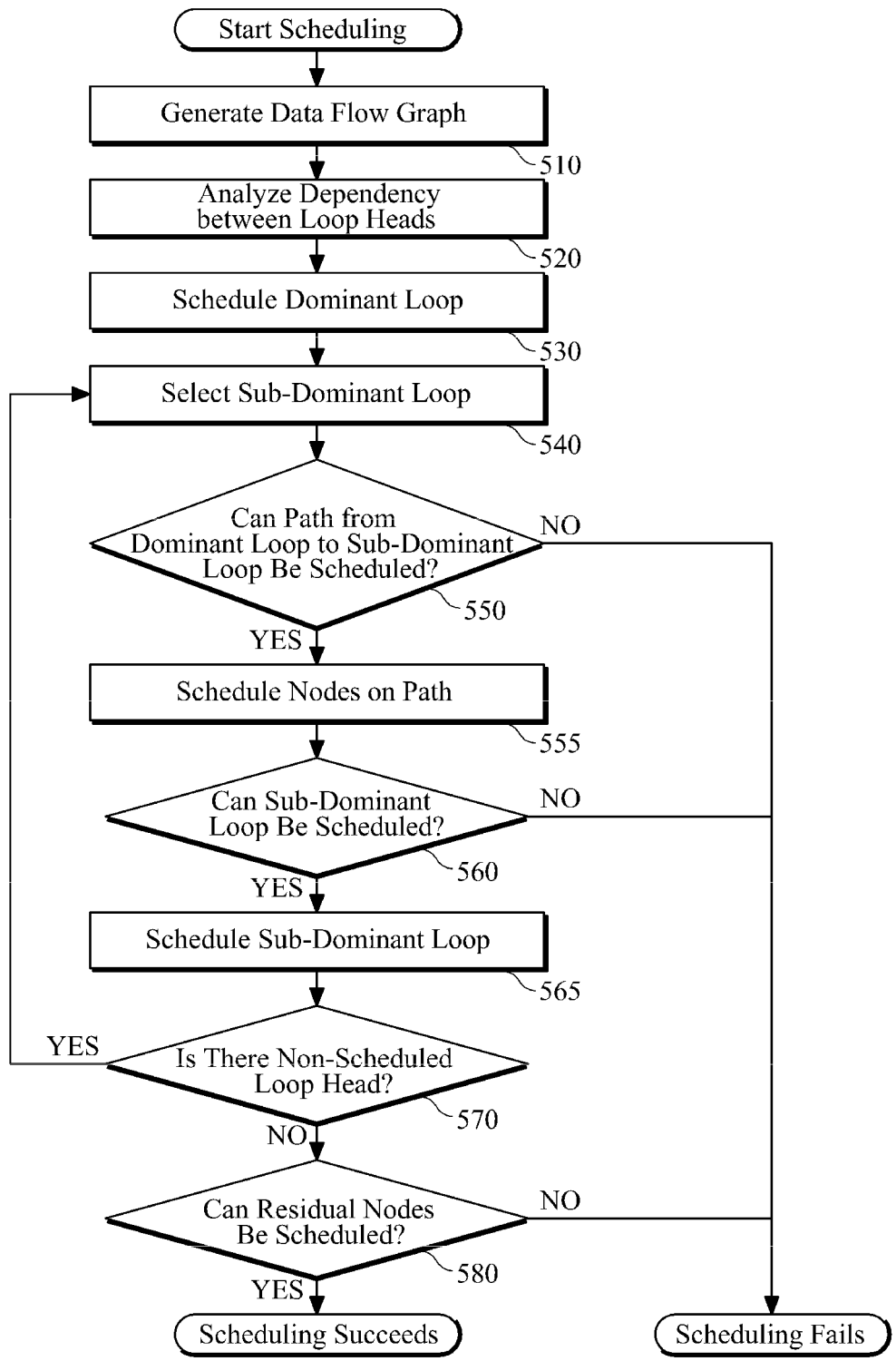
FIG. 5 is a flowchart illustrating another exemplary method of scheduling an instruction.

FIG. 5 is a flowchart illustrating another exemplary method of scheduling an instruction.

A data flow graph is generated (operation 510). During the operation of generating a data flow graph, dependency between loops is checked by analyzing dependency between loop is heads (operation 520). A dominant loop including a loop head having no dependency is scheduled (operation 530). Subsequently, a sub-dominant loop whose dependency has been removed by scheduling the dominant loop is selected (operation 540).

It is checked whether nodes on a path from the dominant loop to the sub-dominant loop can be scheduled (operation 550). When the nodes can be scheduled, they are scheduled (operation 555). Subsequently, it is checked whether the sub-dominant loop can be scheduled (operation 560). When the sub-dominant loop can be scheduled, it is scheduled (operation 565).

It is checked whether there is a non-scheduled loop head (operation 570). When there is a non-scheduled loop head, the process proceeds to operation 540, and the next sub-dominant loop is selected. When there is no non-scheduled loop head, it is checked whether non-scheduled nodes can be scheduled (operation 580). When the non-scheduled nodes can be scheduled, they are scheduled, and scheduling succeeds.

Meanwhile, when it is checked in operation 550, 560 or 580 that the loop or nodes cannot be scheduled, scheduling fails. When scheduling fails, it may be retried at operation 530 after increasing an II by a predetermined clock cycle.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner A number of exemplary embodiments have been described above. Nevertheless, it will be understood that carious modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for scheduling an instruction, the apparatus comprising:
an analyzer configured to analyze a dependency of a plurality of recurrence loops; and
a scheduler configured to schedule the recurrence loops based on the analyzed dependencies,
wherein the scheduler first schedules a dominant loop that has a loop head that has no dependency on another loop, from among the plurality of recurrence loops, and in response to a dependency of a plurality of loop heads of the plurality of recurrence loops being tangled with one another, the scheduler gives priorities to the plurality of loop heads based on a number of non-scheduled predecessors for each respective loop head from among the plurality of loop heads having dependencies that are tangled with one another, and schedules the corresponding recurrence loops based on the priorities given to the respective loop heads.

2. The apparatus of claim 1, wherein the analyzer analyzes the dependency by searching for loop heads to be scheduled in advance for respective loop heads of the recurrence loops using a data flow graph for the instruction.

3. The apparatus of claim 1, wherein, in response to a sub-dominant loop becoming a successive dominant loop because dependency is removed by scheduling the dominant loop, the scheduler schedules nodes on a path from the dominant loop to the sub-dominant loop in a data flow graph and schedules the sub-dominant loop.

4. The apparatus of claim 3, wherein the scheduler schedules non-scheduled nodes among nodes in the data flow graph.

5. The apparatus of claim 1, wherein, in response to two different loop heads being dependent on each other, the scheduler gives priorities to the two different loop heads in increasing order of a number of non-scheduled predecessors among the two different loop heads, and schedules the loops based on the given priorities.

6. The apparatus of claim 5, wherein the scheduler schedules nodes on a path from a first loop head having a high priority to a second loop head having a next priority in the data flow graph.

7. The apparatus of claim 1, wherein, in response to instruction scheduling failing, the scheduler increases a current iteration interval and retries the instruction scheduling based on the increased iteration interval.

8. The apparatus of claim 1, wherein the scheduler gives scheduling priority to a loop head that has a least number of non-scheduled predecessors from among the plurality of respective loop heads.

9. A method of scheduling an instruction, the method comprising:
analyzing a dependency of a plurality of recurrence loops; and
scheduling the recurrence loops based on the analyzed dependency, wherein the scheduling of the plurality of recurrence loops comprises first scheduling a dominant loop that has a loop head that has no dependency on another loop from among the plurality of recurrence loops, and in response to a dependency of a plurality of loop heads of the plurality of recurrence loops being tangled with one another, the scheduling comprises giving priorities to the plurality of loop heads based on a number of non-scheduled predecessors for each respective loop head from among the plurality of loop heads having dependencies that are tangled with one another, and scheduling the corresponding recurrence loops based on the priorities given to the respective loop heads.

10. The method of claim 9, wherein the analyzing of the dependency includes searching for loop heads to be scheduled in advance for respective loop heads of the recurrence loops using a data flow graph for the instruction.

11. The method of claim 9, wherein the scheduling of the recurrence loops includes, in response to a sub-dominant loop becoming a successive dominant loop because dependency is removed by scheduling the dominant loop:

scheduling nodes on a path from the dominant loop to the sub-dominant loop in a data flow graph; and
scheduling the sub-dominant loop.

12. The method of claim 11, further comprising scheduling non-scheduled nodes among nodes in the data flow graph.

13. The method of claim 9, wherein the scheduling of the recurrence loops includes, in response to two different loop heads being dependent on each other, giving priorities to the two loop heads in increasing order of a number of non-scheduled predecessors among the two loop heads, and scheduling loops based on the given priorities.

14. The method of claim 13, wherein the scheduling of the loops based on the given priorities includes scheduling nodes on a path from a first loop head having a high priority to a second loop head having a next priority.

15. The method of claim 9, further comprising, in response to instruction scheduling failing, increasing a current iteration interval and retrying the instruction scheduling based on the increased iteration interval.

\* \* \* \* \*